(12) United States Patent
Shimizu et al.

(10) Patent No.: US 7,416,471 B2
(45) Date of Patent: Aug. 26, 2008

(54) RECOVERY DEVICE OF BLASTING MEDIUM AND METHOD THEREFOR

(75) Inventors: Tokuo Shimizu, Tokyo (JP); Tetsunori Yano, Tokyo (JP); Naoki Okamoto, Kumamoto (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 0 days.

(21) Appl. No.: 11/687,720

(22) Filed: Mar. 19, 2007

(65) Prior Publication Data

US 2007/0218809 A1    Sep. 20, 2007

(30) Foreign Application Priority Data

Mar. 17, 2006   (JP)   ............... 2006-074258

(51) Int. Cl.
  *B24B 49/00*   (2006.01)
  *B24B 51/00*   (2006.01)
  *B24C 9/00*    (2006.01)

(52) U.S. Cl. .................. 451/2; 451/5; 451/38; 451/88; 451/447

(58) Field of Classification Search .............. 451/2, 451/5, 21, 38, 39, 40, 87, 88, 447; 209/552, 209/546, 233
  See application file for complete search history.

(56) References Cited

U.S. PATENT DOCUMENTS 3,805,401 A * 4/1974 Fontein ................. 34/371
4,299,693 A * 11/1981 Paulson ................. 209/3
4,433,511 A    2/1984 Swain
5,545,074 A    8/1996 Jacobs
6,059,641 A * 5/2000 Okamoto ............... 451/99
6,135,127 A * 10/2000 Pieper ................... 134/1
6,390,898 B1   5/2002 Pieper

FOREIGN PATENT DOCUMENTS

| JP | 9-109029 A | 4/1997 |
| JP | 2003-222475 A | 8/2003 |
| WO | 03/055645 A1 | 7/2003 |

* cited by examiner

*Primary Examiner*—Timothy V Eley
(74) *Attorney, Agent, or Firm*—David S. Safran

(57) ABSTRACT

The present invention provides a recovery device of a blasting medium for recovering a blasting medium after use, which has been injected to a work and has fallen therefrom, into a solid-gas separating tank by suctioning with a suction blower, wherein the solid-gas separating tank comprising: a sucking unit of the blasting medium; a vertically rising pipe provided in a vertical direction and adapted to connect the sucking unit and a tank body; a cushioning member disposed opposedly to an upper exit of the vertically rising pipe; a sieve into which the blasting medium that has collided against the cushioning member reducing its velocity falls, and which vibrates to classify a reusable blasting medium and a non-reusable blasting medium; an outlet portion for the reusable blasting medium classified by the sieve and an outlet portion for the non-reusable blasting medium; and an airflow path provided downstream of the sieve in an air current direction, and connected to the suction blower.

19 Claims, 10 Drawing Sheets

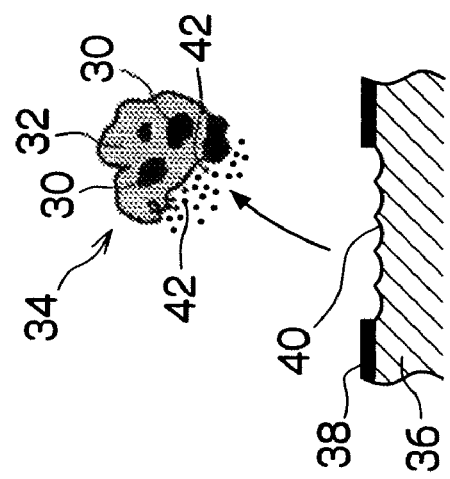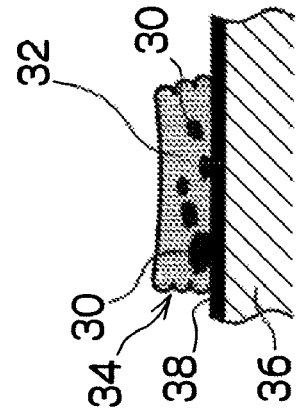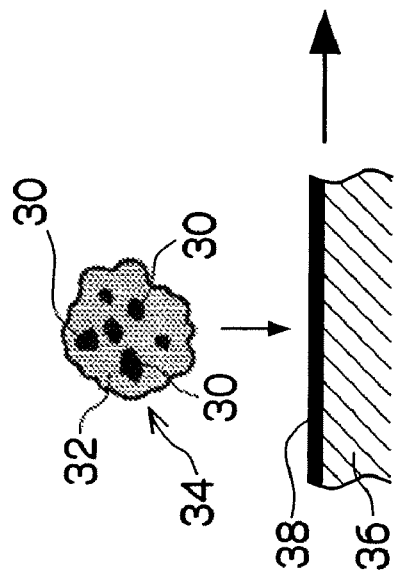

RECOVERY DEVICE OF BLASTING MEDIUM AND METHOD THEREFOR

BACKGROUND OF THE INVENTION

1. Field of the Invention

The present invention relates to a recovery device of a blasting medium and a method therefor, and particularly to a recovery device of a blasting medium of a sponge fragment of which porous elastic body contains an abrasive adhering thereto, and a method therefor.

2. Description of the Related Art

When recoating a coated wall surface, blasting operation is conducted as preparatory work to grind the coat layer off the wall thereby roughening the coating surface for substrate conditioning.

Such blasting operation has been conducted by a sand blasting method such as described in, for example, Japanese Patent Application Laid-Open No. 9-109029. A sand blasting method is a method for injecting sand (blasting material) from a nozzle with a high speed air causing it to collide against the coating surface to grind the coat layer off the coating surface with the impact force thereby roughening the surface.

The sand blasting method, however, had a problem in that since the blasting material is rebounded with strong force, there occurs scattering of dust particles. Further, there was a drawback that the operator who handles the nozzle must be heavily equipped for protecting himself or herself from the blasting material rebounded with strong force thus suffering poor workability. Furthermore, since the operator has a very poor visual field due to the scattered dust particles, it was difficult to perform the operation at a uniform quality.

To solve such problems, there is a known method, so called a sponge blasting method, which utilizes a blasting medium of a sponge fragment of which porous elastic body contains an abrasive adhering thereto.

According to this sponge blasting method, when the sponge blasting media, which has been injected from a nozzle with a high speed air, collides against the coating surface, the blasting media becomes flattened causing the mixed abrasive to collide directly against the coating surface at a high speed. This allows, as with the sand blasting method, the coat layer to be ground and removed. Further, since dust particles, which would otherwise float in the air, will be taken into the sponge fragment and fall as they are, the method offers an advantage of decreasing the scattering of dust particles. Furthermore, there is another advantage that since the sponge fragment absorbs repulsive force, the bouncing off is significantly reduced thereby circumventing the need of heavy equipment for the operator who handles the nozzle.

Further, Japanese Patent Application Laid-Open No. 2003-222475 discloses a classification method of copper slag used as the sand blasting material, to obtain the slag having a particle size of around 1500 to 3500 micrometers, which is useful as the sand blasting material, by sieving with a jumping screen.

SUMMARY OF THE INVENTION

Since the sponge blasting medium is reusable, though only part of it being so for only a few times, it is desired to recover an injected sponge blasting medium and separate and classify the reusable part of it for reuse. However, heretofore, there has not been proposed a device for efficiently performing the recovery, separation and classification of a blasting medium.

The present invention has been made in view of above described problems, and its object is to provide a recovery device of a blasting medium which is capable of efficiently performing the recovery, separation and classification of a blasting medium, and a method therefor.

The inventive device according to a first aspect of the present invention is a recovery device of a blasting medium for recovering the blasting medium after use, which has been injected to a work and has fallen therefrom, into a solid-gas separating tank by suctioning with a suction blower, wherein the solid-gas separating tank comprises: a sucking unit of the blasting medium; a vertically rising pipe provided in a vertical direction and adapted to connect the sucking unit and the tank body; a cushioning member disposed oppositely to an upper exit of the vertically rising pipe; a sieve into which the blasting medium that has collided against the cushioning member reducing its velocity falls, and which vibrates to classify a reusable blasting medium and non-reusable blasting medium; an outlet portion for the reusable blasting medium classified by the sieve and an outlet portion for a non-reusable blasting medium; and an airflow path provided downstream of the sieve in the air current direction, and connected to the suction blower.

According to the first aspect of the present invention, firstly the suctioned blasting medium after use is introduced into the sucking unit, which is the entrance of the solid-gas separating tank, and relatively large dusts which have been suctioned with the blasting medium are separated by a coarse mesh or sieve member contained in the sucking unit. Then the blasting medium which passed through the mesh or sieve member is forced to rise in the vertically rising pipe thereby reducing the velocity thereof, and is injected upward from the exit of the vertically rising pipe. This causes the blasting medium to collide against the cushioning member without being broken and further decreasing the velocity thereof, and to fall to the sieve. The sieve is excited as a whole by a vibration generator. Therefore, the non-reusable blasting medium out of the blasting medium which has fallen onto the sieve is caused to pass through the sieve by the vibrating sieve, and falls into an outlet portion formed below the sieve 88 to be taken out. On the other hand, the reusable blasting medium out of the blasting medium which has fallen onto the sieve, slides down on the sieve without passing through it and falls into an outlet portion to be taken out. Thus, the present invention makes it possible to efficiently perform the recovery, separation and classification of a blasting medium.

A second aspect of the present invention is characterized in that there are further provided in the first aspect of the invention a block-type gate member which adjusts the velocity of air current flowing in the airflow path by varying the volume of the airflow path; and a quantity measuring device which measures the quantity of the blasting medium discharged from an exit of the airflow path per unit time.

According to the second aspect of the invention, the volume of the airflow path can be varied by the block-type gate member based on the quantity measured by the quantity measuring device to adjust the velocity of the air current flowing in the airflow path. That is, when the quantity of a blasting medium is large, the volume of the airflow path is increased by means of the block-type gate member thereby reducing the velocity of the air current flowing in the airflow path. This allows the solid-gas separation to be reliably performed.

A third aspect of the present invention is characterized in that in the first or second aspect of the invention, there are further comprised of: an air velocity measuring device which measures the air velocity of the air current flowing in the vertically rising pipe; a pressure measuring device which measures the pressure in the vertically rising pipe; and a control device which controls the rotational speed of the suction blower based on an air velocity measurement at the air velocity measuring device so that the air velocity is within a predetermined range, and which controls the rotational speed of the suction blower to be not larger than a predetermined value based on a pressure measurement at the pressure measuring device when the pressure in the vertically rising pipe exceeds a predetermined value.

According to the third aspect of the invention, since the air velocity of the air current flowing in the vertical riser tube and the pressure in the same are measured, and the rotational speed of the blower is controlled based on the measurements, it is possible to prevent failures of the blower caused by a blockage of the vertically rising pipe.

A fourth aspect of the invention is characterized in that in the first, second or third aspect of the invention, the inclination angle of the cushioning member and/or the sieve is adjustable.

According to the fourth aspect of the invention, since the inclination angle of the cushioning member is adjustable, it is possible to adjust the angle of the cushioning member so as to prevent the collision between the blasting medium which is rising toward the cushioning member and the blasting medium which has collided against the cushioning member and is falling down. Moreover, since the inclination angle of the sieve can be adjusted depending on the kind of a blasting medium, it is possible to adequately classify the blasting medium which has fallen onto the sieve by means of the cushioning member.

A fifth aspect of the present invention is characterized in that in the first, second, third or fourth aspect of the invention, top and bottom end parts of the vertically rising pipe are configured to be extendable, a slide gate which adjusts an opening area of an entrance of the airflow path is provided to be movable up and down, and the distance between a cushioning plate, which is disposed between the sucking unit and the vertically rising pipe and against which the blasting medium collides, and the sucking unit is adjustable.

According to the fifth aspect of the invention, by adjusting: the amount of extension/contraction of the top and bottom end parts of the vertically rising pipe; the entrance opening area of the airflow path by the slide gate; and the distance between the cushioning plate, which is disposed between the sucking unit and the vertically rising pipe and against which the blasting medium collides, and the sucking unit, it is possible to perform optimum suction and solid-gas separation depending on the kind of the blasting medium of different volumes or masses. For example, in the case of blasting medium of a large mass, the bottom end part of the vertically rising pipe is extended to increase the suction force, the entrance opening area of the airflow path by the slide gate is decreased, and the distance between the cushioning plate and the sucking unit is set to be smaller. Further, in the case of a sponge-type blasting medium of a small mass, the above described setting may be reversed.

A sixth aspect of the present invention is characterized in that in the first, second, third, fourth or fifth aspect of the invention, the flow path in the upper part of the vertically rising pipe is configured to be in the form of a labyrinth.

According to the sixth aspect of the invention, since the velocity of the air current containing a blasting medium, which is rising in the vertically rising pipe, is reduced, it is possible to achieve a solid-gas separation effect in the vertically rising pipe.

A seventh aspect of the present invention is characterized in that in the first, second or third aspect of the invention, an atmospheric inlet valve is provided in the upper part of the vertically rising pipe and the amount of suction suctioned by the suction blower is controlled to be within a predetermined range.

According to the seventh aspect of the invention, although when the vertically rising pipe is blocked with a blasting medium, an excess current may flow in the suction blower thereby causing a failure of the suction blower, an atmospheric release valve is provided in the upper part of the vertically rising pipe so that the atmospheric release valve is opened when an excess current flows in the suction blower caused by the blockage in the vertically rising pipe. This allows the suction blower to be operated stably thus preventing failures thereof.

A eighth aspect of the present invention is characterized in that in the first or second aspect of the invention, the block-type gate member is automatically moved by a driving mechanism so that the pressure in the vertically rising pipe is within a predetermined range and the quantity of the blasting medium measured by the quantity measuring device is not larger than a predetermined value. According to the eighth aspect of the invention, the block-type gate member is automatically moved by a driving mechanism so that the pressure in the vertically rising pipe is within a predetermined range and the quantity of the blasting medium measured by the quantity measuring device is not larger than a predetermined value. This enables an automatically controlled operation.

The inventive method according to a ninth aspect of the present invention is characterized in that in order to achieve the above described object, the method comprises: using the recovery device according to any one of the first to eighth aspects; obtaining historical information indicating the number of reuses and operating conditions in accordance with the number of reuses for each kind of the blasting medium; and controlling, in a subsequent operation, such that the operating condition in accordance with the number of reuses of that kind of the blasting medium is automatically reproduced and set from the historical information.

According to the ninth aspect of the invention, historical information indicating the number of reuses and operating conditions in accordance with the number of reuses for each kind of the blasting medium is obtained; and in a subsequent operation, control is performed such that the operating condition in accordance with the number of reuses of that kind of the blasting medium is automatically reproduced and set from the historical information. This allows an optimal automatic control operation in accordance with a selected blasting medium.

The recovery device of a blasting medium and the method therefor according to the present invention can efficiently perform the recovery, separation and classification of a blasting medium.

BRIEF DESCRIPTION OF THE DRAWINGS

FIGS. 2A to 2C illustrate the mechanism of a sponge blasting;

DETAILED DESCRIPTION OF THE PREFERRED EMBODIMENTS

Hereinafter, preferred embodiments of the recovery device of a blasting medium and the method therefor according to the present invention will be described in detail with reference to the appended drawings.

Figure 1:
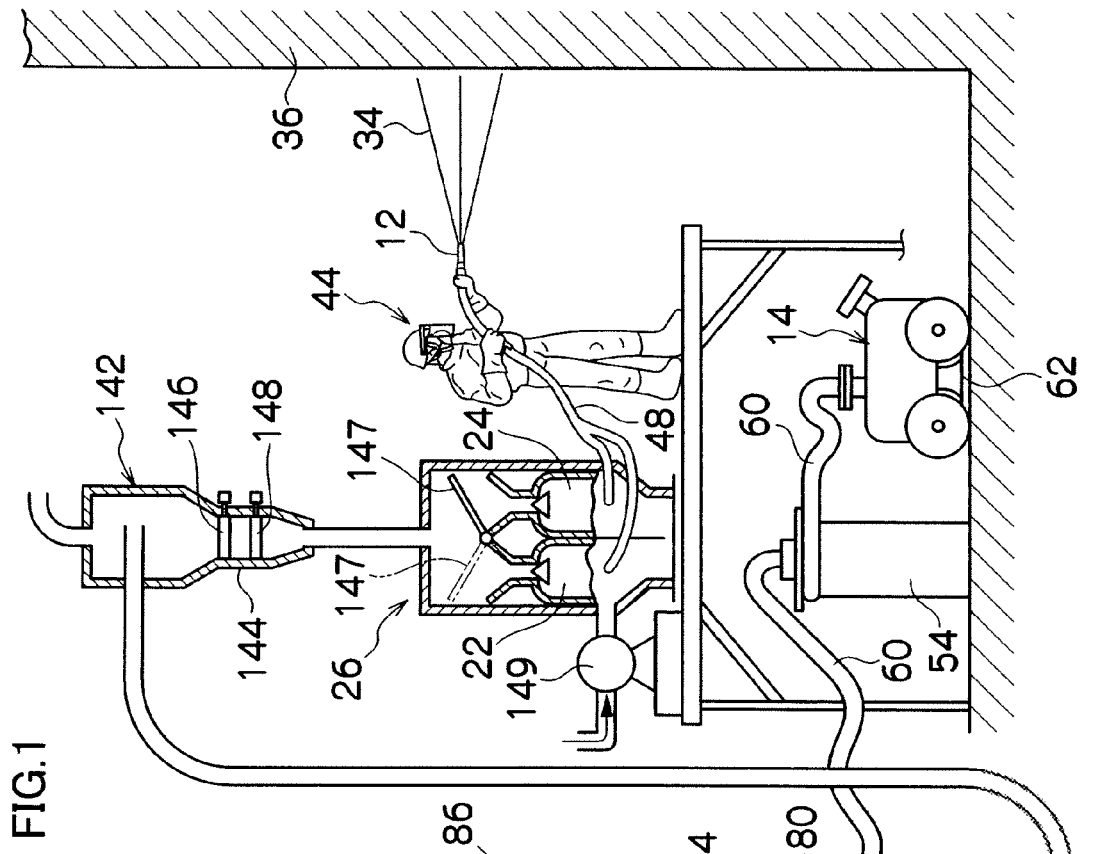
FIG. 1 is a general configuration diagram of a sponge blasting apparatus to which the solid-gas separating tank according to the first embodiment of the present invention is applied.

FIG. 1 is a reference drawing to show a general configuration of a sponge blasting apparatus 10 for illustrating embodiments of the recovery device of a blasting medium. The recovery device of a blasting medium according to the present invention can be applied, without being limited to sponge blasting apparatus being applicable to sand blasting apparatus as well.

The sponge blasting apparatus of FIG. 1 is comprised of a nozzle 12 for spraying a blasting medium of a sponge fragment, a self-propelled recovering 14 for suctioning and recovering the blasting medium injected from the nozzle 12, a solid-gas separating tank (a recovery device of a blasting medium) 16 for classifying the blasting medium, which has been suctioned and recovered by the self-propelled recovering 14, into a reusable blasting medium and a non-reusable blasting medium, a blower 18 for providing suction force to the self-propelled recovering 14 via the solid-gas separating tank 16, a bag filter 20 for removing dusts in the discharged air, which has been discharged from the solid-gas separating tank 16, by the suction force of the blower 18, a continuous feeding device 26 having at least two storage tanks 22 and 24, into which the reusable blasting medium classified by the solid-gas separating tank 16 is introduced, and for continuously feeding the blasting medium stored in the tanks 22, 24 to the nozzle 12 alternately switching the two tanks 22 and 24, a blower 28 for air conveying the reusable blasting medium classified by the solid-gas separating tank 16 to the continuous feeding device 26, and others.

Firstly, a sponge blasting method using the sponge blasting apparatus 10 will be described.

The blasting medium used for this method is comprised of a sponge fragment 32 to which an abrasive 30 formed of a different material (steel grit, alumina, Star Light, urea resin, etc.) depending on the application adheres as shown in FIG. 2. This blasting medium 34 is injected by high-pressure air to the coat layer 38 of a work 36 to grind the coat layer 38 and roughen the painted surface 40 thereby providing surface conditioning.

According to this sponge blasting method, when the blasting medium 34 collides against the coat layer 38 as shown in FIG. 2A, the blasting medium 34 will become flattened as shown in FIG. 2B, and the abrasives 30, 30 . . . adhering thereto collides at a high speed directly against the coat layer 38. This allows the coat layer 38 to be ground as shown in FIG. 2C as in the case of the sand blasting method. Moreover, since the dust particles 42, 42 . . . , which would otherwise float in the air, are taken into the sponge fragment 32 and fall down as they are, it is possible to prevent the scattering of dust particles. Furthermore, the bouncing off of the blasting medium 34 is kept at a very low level since the repulsive force is absorbed by the sponge fragment 32.

Figure 3:
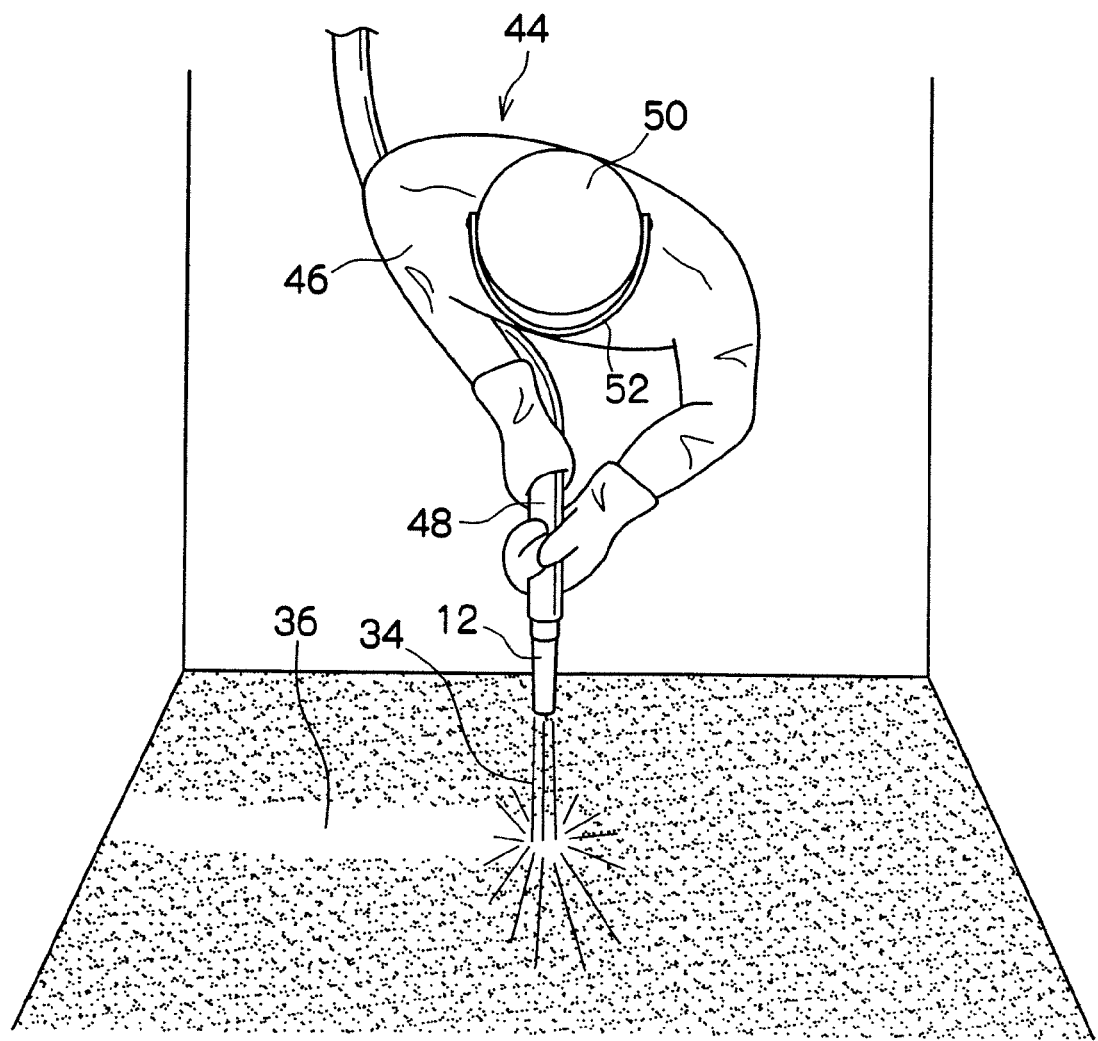
FIG. 3 illustrates the operator's equipment for a sponge blasting.

Therefore, the protective wear 46 of the operator 44 who handles the sponge blasting apparatus 10 need not be so heavy either, as shown in FIG. 3. FIG. 3 shows a scene that the operator 44 grasps the hose 48 near the nozzle 12 of the sponge blasting apparatus 10 with both hands and is injecting the blasting medium 34 toward the work 36. This operator 44 does not need to wear a protector all over the body as in the case of sand blasting method and, as for helmet 50, instead of a full-face type one which covers entire head and face, a standard helmet used in construction sites and attached with a face protector 52 made of a transparent acryl plate is used thus resulting in the very lightweight protective wear 46. Since this decreases the weight of equipment, it is possible to significantly reduce the labor of the operator 44.

Figure 4:
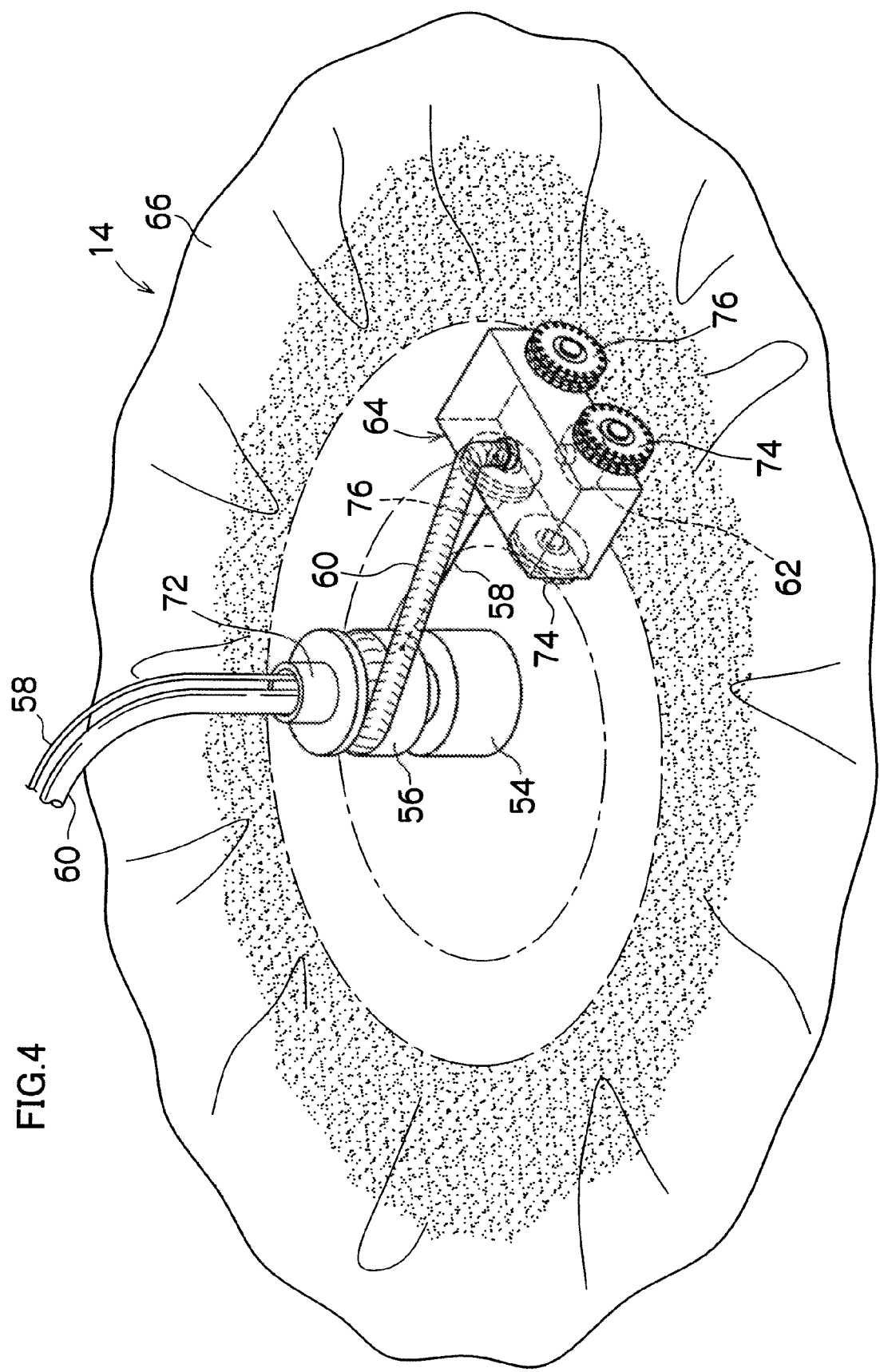
FIG. 4 is a perspective view of a self-propelled recovering which is applied to the sponge blasting apparatus of FIG. 1.
Figure 5:
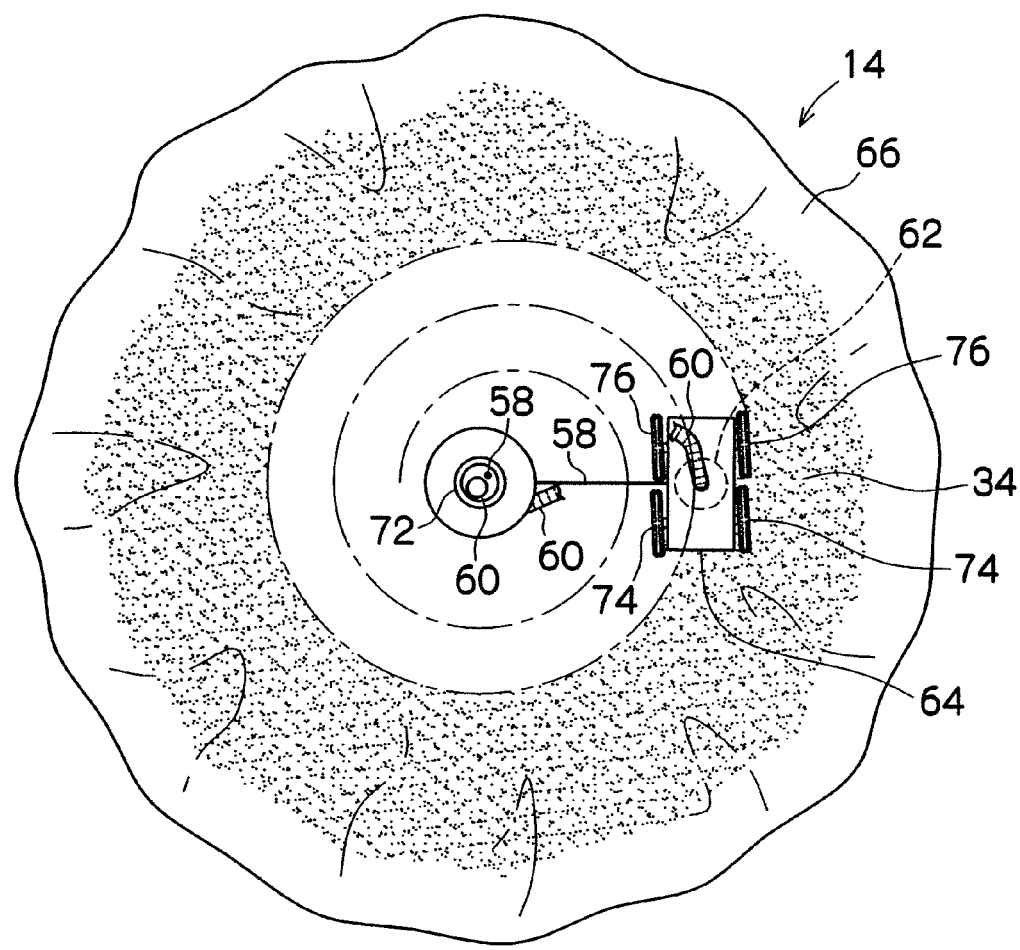
FIG. 5 is a plan view of the self-propelled recovering shown in FIG. 4.

FIG. 4 is an enlarged perspective view of the self-propelled recovering 14 shown in FIG. 1. This self-propelled recovering 14 consists of a center base 54, a rotational body 56 capable of functioning as a reel, a power supply cable 58 capable of functioning as a towing member, a sucking hose 60 for the blasting medium 34, and a sucking vehicle 64 provided with a suction port 62.

The center base 54 is installed by its own weight at a predetermined position on a sheet 66 to which the blasting medium 34 will fall. Moreover, the center base 54 contains a motor not shown and a battery for supplying power to the motor. The rotational axis 68 of the aforementioned motor (see FIG. 6) protrudes from the top of the center base 54 and a rotating body 56 is fixed to the upper part of the axis. Therefore, the rotating body 56 is rotated at a predetermined rotational speed by the driving force of the motor contained in the center base 54.

Figure 6:
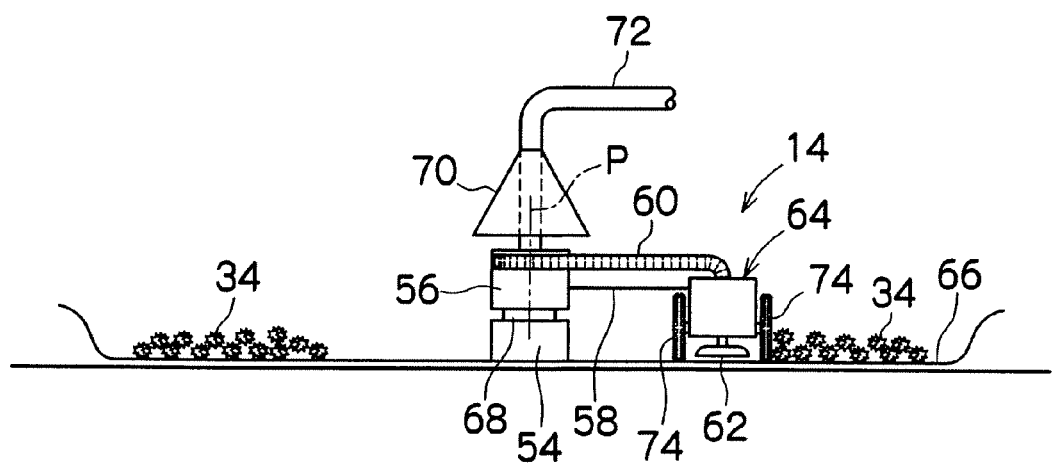
FIG. 6 is a side view of the self-propelled recovering shown in FIG. 4.

The center base 54 and the rotating body 56 are installed on the sheet 66 before the injection work of the blasting medium 34. In this case, to prevent the falling blasting medium 34 from accumulating on the center base 54 and the rotating body 56, an umbrella member 70 is attached above the rotating body 56 as shown in FIG. 6. This umbrella member 70 is fixed to a pipe 72 which is disposed from the upper part of the rotating body 56 via a bearing not shown. Moreover, the power supply cable 58 and the sucking hose 60 are inserted into the pipe 72 so that the power supply cable 58 and the sucking hose 60 are laid from the outside to the sucking vehicle 64 via the rotating body 56.

On the other hand, the rotating body 56 contains a reel device (not shown) for winding and rewinding the power supply cable 58 and the sucking hose 60, which are laid from the rotating body 56 to the sucking vehicle 64, as the rotating body 56 rotates. By interlocking the motion of the reel device with the rotation of the rotating body 56, the sucking vehicle 64 connected to the power supply cable 58 and the sucking hose 60 is adapted to travel approximately along a spiral centered on the rotational axis 68. Further, this reel device controls the winding/rewinding speed of the power supply cable 58 and the sucking hose 60 so that the sucking vehicle 64 is moved in the radial direction by the size of the suction port 62 (a diameter when the suction port is circular, and a perimeter when the suction port is rectangular) for every revolution of the rotating body 56. This makes it possible to fully recover the blasting medium 34 which has fallen onto the sheet 66 without leaving it behind.

The suction port 62 provided in the sucking vehicle 64 is disposed in the bottom portion and between the front wheels 74, 74 and the rear wheels 76, 76 of the sucking vehicle 64, which is of a four-wheel drive type. There may be provided, without being limited to one, multiple suction ports 62 in the bottom portion of the sucking vehicle 64.

As shown in FIG. 1, the solid-gas separating tank 16 is comprised of a sucking unit 80 connected to a sucking hose 60 of a self-propelled recovering 14, a vertically rising pipe 84 provided in the vertical direction and connecting the sucking unit 80 and the tank body 82, a plate (cushioning member) 86 covered with, for example, 5 mm-thick urethane and disposed oppositely to the upper exit of the vertically rising pipe 84, a sieve 88 to which the blasting medium 34, which has collided against the urethane-lined plate 86 and has reduced its speed, falls and which classifies a reusable blasting medium and a non-reusable blasting medium through the vibration of itself, a take-out device 90 of the reusable blasting medium 34 classified by the sieve 88, a take-out device 92 of the non-reusable blasting medium 34, and others.

The blasting medium 34 after use which has been suctioned through the sucking hose 60 is introduced into the sucking unit 80 which is an entrance of the solid-gas separating tank 16, and dusts such as relatively large wood chips which have been suctioned with the blasting medium 34 are separated by a mesh or a coarse wire mesh which is not shown and contained in the sucking unit 80. The blasting medium 34 which has passed the mesh or the wire mesh is forced to rise in the vertically rising pipe 84 by the suction force of a blower 18 (for example, −47 kPa, 30 m$^3$/min, 30 kW) thereby reducing its speed and is injected upwardly from the exit of the vertically rising pipe 84. This causes the blasting medium 34 to collide against the urethane-lined plate 86 further reducing its speed without being broken, and is thrown into a solid-gas separation chamber 94 having a larger volume in the tank body 82. At this point, the velocity of the blasting medium 34 becomes not higher than its terminal velocity and falls freely down to the sieve 88 installed in the solid-gas separation chamber 94.

The sieve 88 is adapted to have an optimal inclination angle which is set depending on various conditions such as the kind of the blasting medium 34 which includes different kinds of abrasives such as steel grit, aluminum, Star Light, urea resin, and the like, and the suction force of the blower 18. There are attached in a substantially central portion of the underside of the sieve 88 a pressurized-air driven vibrator 96 and a vibration transfer member (not shown) for transferring the vibration of the vibrator 96 to the entire sieve 88 so that the entire sieve 88 is excited by the vibrator 86. Therefore, the non-reusable blasting medium 34 out of the blasting medium 34 which has fallen to the sieve 88 is caused to pass through the sieve 88 by the vibration of the sieve 88 and to fall to a hopper-shaped reservoir (outlet portion) 98 formed below the sieve 88 to be stored therein. Then, a rotary feeder 100 connected to the hopper-shaped reservoir 98 is driven thereby discharging the blasting medium 34 into a trash box 102.

On the other hand, the reusable blasting medium 34 out of the blasting medium 34 which has fallen to the sieve 88 descends along the vibrating sieve 88 without passing though the sieve 88 and slides down into a hopper-shaped reservoir (outlet portion) 104 provided in the rear stage of the tank body 82 to be stored therein.

Since the blasting medium 34 stored in the hopper-shaped reservoir 104 becomes massive due to its own humidity, it can not be fed to a continuous feeding device 26 as it is. Then, in one embodiment, the blasting medium 34 is forced to fall to a picking-apart device 106, which constitutes a take-out device 90, thereby being finely picked apart. The blasting medium 34 which has been loosely picked apart by the picking-apart device 106 is fed to a positive-pressure feed pipe 110 via a double damper 108, and is air conveyed toward the continuous feeding device 26 by the compressed air of the blower 28 linked to this positive-pressure feed pipe 110.

The double damper 108 is a damper to isolate the solid-gas separating tank 16, which is set to be at a negative pressure, from the positive-pressure feed pipe 110 which is at a positive pressure, and comprises an upper damper 130 and a lower damper 132.

Although these dampers 130 and 132 are held in a closed state, the damper 130 is opened when the picking-apart device 106 is driven and a predetermined amount of the blasting medium 34 which has been loosely picked apart is stored in a damper 130. This causes the blasting medium 34 to fall to the damper 132 and to be stored therein. Subsequently, when the damper 130 is closed and at the same time the damper 132 is opened, the blasting medium 34 falls to the positive-pressure feed pipe 110, and the fallen blasting medium 34 is air conveyed toward the continuous feeding device 26 by the compressed air from the blower 28. Further, at the timing when all of the blasting medium 34 on the damper 132 has fallen to the positive-pressure feed pipe 110, the damper 132 is closed. By repeating this operation, it is made possible to supply the blasting medium 34, which is reusable and has been loosely picked apart, to the continuous feeding device 26.

On the other hand, a part of the blasting medium 34 which has fallen from the picking-apart device 106 is fed into a particle size measuring unit 135 by opening of the valve 133, and the particle size is measured.

On the other hand, as shown in FIG. 1, the discharged air discharged from the solid-gas separating tank 16 by the suction force of the blower 18 is introduced into the bag filter 20 via the exit duct 134. At this point, the discharged air is passed through filters 136, 136 of the bag filter 20 thereby being removed of the dust particles of the blasting medium 34 and other dusts contained in the discharged air, and is released into the atmosphere. Accordingly, the work environment is significantly improved. Further, the dusts which have adhered to the filter 136, 136 are detached from the filter 136, 136 by a reverse washing of the filter 136, 136 thereby falling into a lower hopper 138. Then, by opening the lid 140 of the lower hopper 138, it is possible to dispose the dusts from the bag filter 20.

The blasting medium 34 which has been air conveyed to the positive-pressure feed pipe 110 is thrown into a cyclone separator 142 provided upstream of the continuous feeding device 26, and is separated from air.

The blasting medium 34 separated from air falls to a damper 146 provided in the lower hopper 144 of the cyclone separator 142. When a predetermined amount of a blasting medium 34 is stored on the damper 146, the damper 146 is opened. This causes the blasting medium 34 to fall onto the damper 148 provided below the damper 146 and to be stored therein. After that, the damper 146 is closed thereby isolating the cyclone separator 142 from the continuous feed tube 26. And when the damper 148 is subsequently opened, the blasting medium 34 falls to the continuous feeding device 26. At the timing when all the blasting medium 34 on the damper 148 has fallen to the continuous feeding device 26, the damper 148 is closed. By repeating this operation, the blasting medium 34 is fed from the cyclone separator 142 to the continuous feeding device 26.

The continuous feeding device 26 is comprised of two storage tanks 22 and 24 into which the blasting medium 34 is thrown form the cyclone separator 142, a selector valve 147 which guides the blasting medium 34 from the cyclone separator 142 so that the blasting medium 34 is thrown into one tank 22 (24) of the two tanks 22 and 24, a blower 149 which switches alternately two tanks 22 and 24 and continuously feeds the blasting medium 34 stored in the tank 22 (24) to the nozzle 12, and others.

Next, the operation of the sponge blasting apparatus 10 configured as described above will be described.

Firstly, this sponge blasting apparatus 10 is configured by connecting in series a self-propelled recovering 14, a solid-gas separating tank 16, a bag filter 20, and a blower 18 as shown in FIG. 1. Therefore, according to this sponge blasting apparatus 10, the suction force of the blower 18 is transferred from the bag filter 20 to the self-propelled recovering 14 via the solid-gas separation device 16 and, by utilizing the suction force, the self-propelled recovering 14 recovers the blasting medium 34.

Thus a recovered blasting medium 34 is classified into a reusable blasting medium 34 and a non-reusable blasting medium 34 in the solid-gas separating tank 16. And the reusable blasting medium 34 is taken out from the solid-gas separating tank 16 and conveyed to the continuous feeding device 26 by the blower 28.

The continuous feeding device 26 includes two storage tanks 22 and 24 into which a reusable blasting medium 34 is thrown, and when feeding the blasting medium 34 stored in the first tank 22 to the nozzle 12, the reusable blasting medium 34 is conveyed to the second tank 24 and when the first tank 22 is depleted, the blasting medium 34 stored in the second tank 24 is fed to the nozzle 12.

Thus, according to one embodiment of the sponge blasting apparatus 10, a reusable blasting medium can be continuously fed to the nozzle.

Although three blowers 18, 28 and 149 are installed in the embodiment of the sponge blasting apparatus 10 shown in FIG. 1, preferably one blower is shared.

Moreover, in FIG. 1, although configuration is such that a reusable blasting medium 34 is fed to the positive-pressure feed pipe 110 via the double damper 108, this is not limiting.

Figure 7:
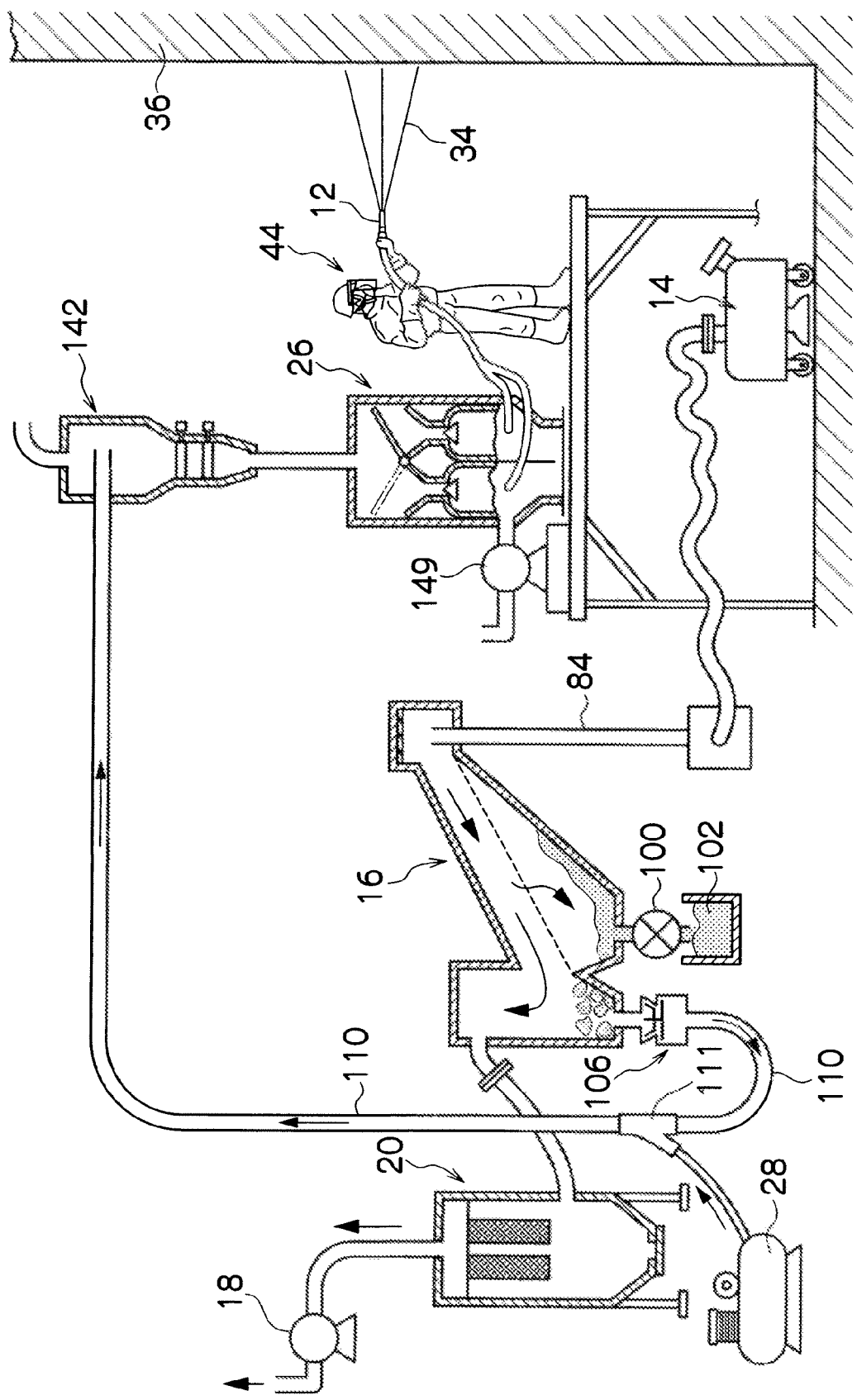
FIG. 7 is a general configuration diagram of the sponge blasting apparatus according to another embodiment.

For example, as shown in FIG. 7, the blasting medium 34 which has fallen from the picking-apart device 106 may be conveyed toward the continuous feeding device 26 by directly connecting a positive-pressure feed pipe 110 to the exit portion of a picking-apart device 106 and connecting a blower 28 to the positive-pressure feed pipe 110 via an ejector 111 thereby utilizing an ejector effect due to the compressed air from the blower 28.

Figure 8:
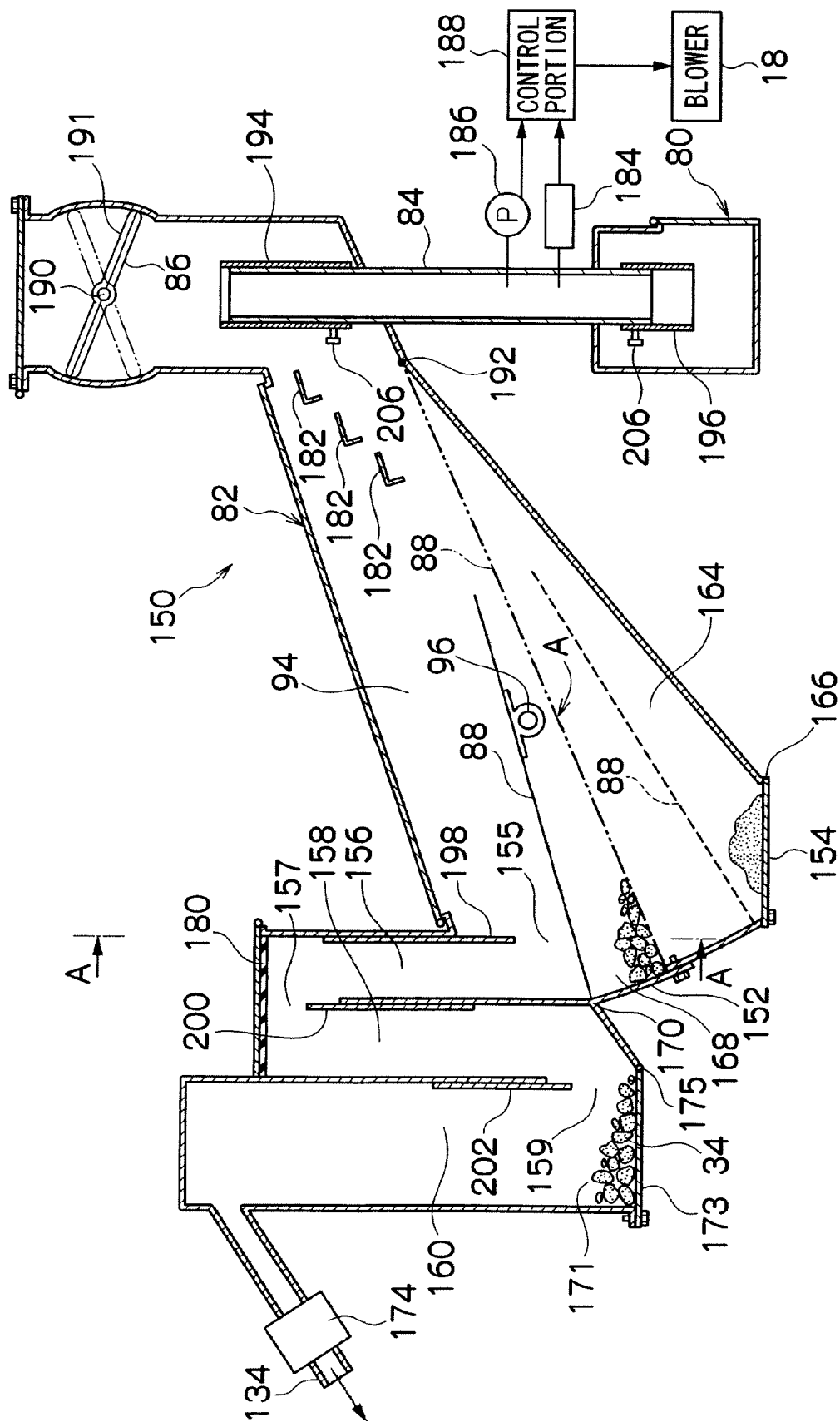
FIG. 8 is a longitudinal sectional view of the solid-gas separating tank according to the second embodiment.

FIG. 8 is longitudinal sectional view of the solid-gas separating tank (recovery device of blasting medium) 150 according to the second embodiment, in which like symbols are used to describe like or similar members in the solid-gas separating tank 16 of the first embodiment shown in FIG. 1.

The solid-gas separating tank 150 shown in FIG. 8 is comprised of a sucking unit 80 of the blasting medium 34, a vertically rising pipe 84 which is provided in a vertical direction and connects the sucking unit 80 and the tank body 82, a urethane-lined plate (cushioning member) 86 disposed oppositely to the upper exit of the vertically rising pipe 84, a sieve 88 to which the blasting medium 34, which has collided against the urethane-lined plate 86 losing its velocity, falls and which vibrates to classify a reusable blasting medium and a non-reusable blasting medium, an outlet door (outlet portion) 168 for a reusable blasting medium 34 classified by the sieve 88, an outlet door (outlet portion) 154 for a non-reusable blasting medium 34, airflow paths 156, 158 and 160 in the form of a labyrinth which is provided downstream of the sieve 88 in the air current direction and is connected to the suction blower 18 (see FIG. 1), and others.

According to this solid-gas separating tank 150, the blasting medium 34 after use which has been suctioned by the self-propelled recovering 14 of FIG. 1 is firstly introduced into a sucking unit 80 which is an entrance of the solid-gas separating tank 150. At this point, relatively large dusts (such as wood chips, etc.) which have been suctioned with the blasting medium 34 are separated by a coarse mesh 162 or a sieve member of FIG. 9A contained in the sucking unit 80.

The blasting medium 34 which has passed the mesh 162 or sieve member is forced to rise in the vertically rising pipe 84 of FIG. 8 having a larger sectional area than the hose 60 (see FIG. 1) thereby reducing its velocity and is injected upwardly from the exit of the vertically rising pipe 84. This causes the blasting medium 34 to collide against the urethane-lined plate 86 further reducing its speed without being broken, and to fall onto the sieve 88.

The sieve 88 is excited as a whole by a vibrator 96. Therefore, non-reusable powdery blasting medium 34 out of the blasting medium 34 which has fallen to the sieve 88 is caused to pass through the sieve 88 by the vibrating sieve 88 and fall into the outlet portion 164 formed below the sieve 88. Subsequently, it is taken out from the solid-gas separating tank 150 by opening the door 154, which is provided in the bottom part of the outlet portion 164, by utilizing a hinge 166.

On the other hand, a reusable blasting medium out of the blasting medium 34 which has fallen to the sieve 88 becomes to have a velocity not higher than its terminal velocity while passing through the airflow paths 156, 158 and 160, and accumulates in the outlet portion 171 provided in the lower portion of the airflow path 160. Then this blasting medium is taken out from the solid-gas separating tank 150 by opening the door 173 provided in the outlet portion 171 by utilizing the hinge 175. Thus, according to one embodiment of the solid-gas separating tank 150, it is possible to effectively perform the recovery, separation and classification of the reusable and non-reusable blasting medium 34.

Further, when recovering the blasting medium 34 with poor fluidity out of the blasting medium 34, the sieve 88 is inclined at position A. This allows the reusable blasting medium 34 with poor fluidity out of the blasting medium 34 to slide down the sieve 88 and accumulates in the outlet portion 168 at the downstream end portion of the sieve 88. Then, the blasting medium 34 is taken out from the solid-gas separating tank 150 by opening the door 152 provided in the outlet portion 168 by utilizing the hinge 170.

Figure 10:
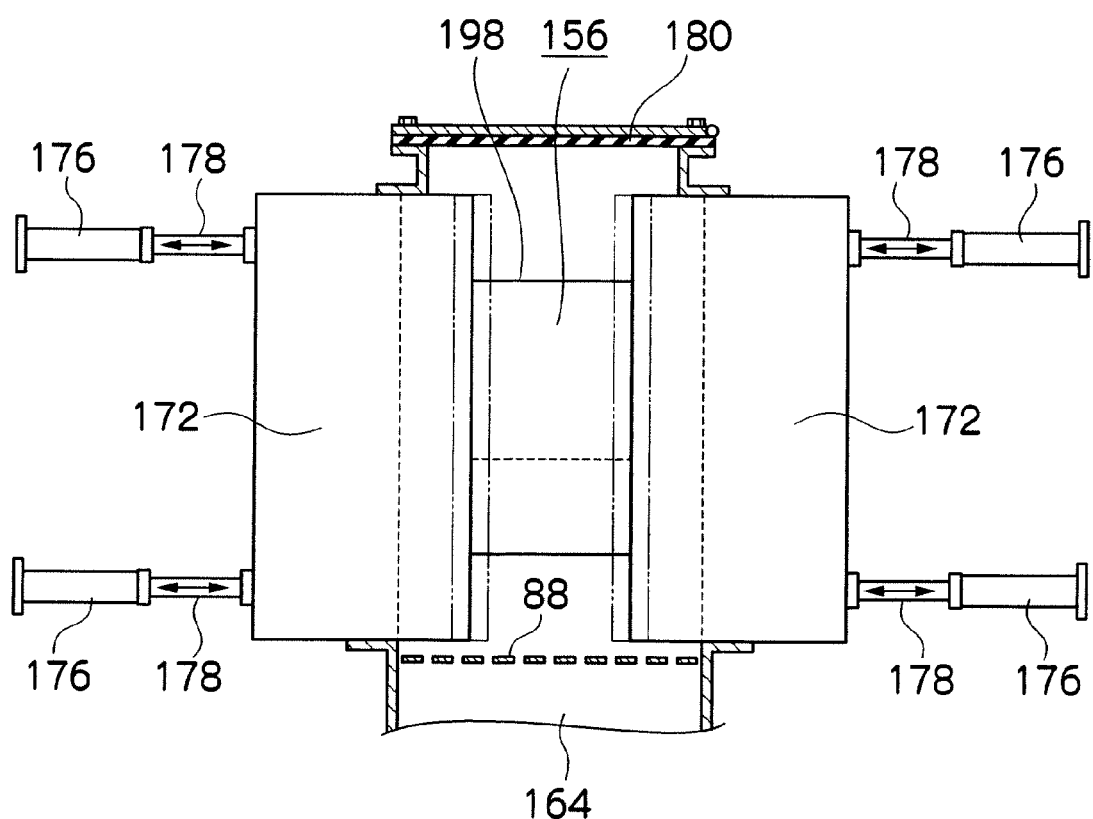
FIG. 10 is a sectional view taken by A-A' in FIG. 8.

Further, one embodiment of the solid-gas separating tank 150 is provided with a pair of horizontal block gates (block-type gate member) 172, 172 which adjust the velocity of the air current flowing in the airflow path 156 by varying the volume of the airflow path 156 as shown in FIG. 10. Furthermore, as shown in FIG. 8, there is provided a particle counter (quantity measuring device) 174 which measures the quantity of the blasting medium 34 discharged from the exit duct 134 of the airflow path 156 per unit time.

As shown in FIG. 10, a pair of horizontal block gates 172, 172 are connected to pistons 178, 178 of a pair of vertical cylinder devices 176, 176 disposed thereoutside, and are moved back and forth with respect to the airflow path 156 by extending/contracting the pistons 178, 178 concurrently. That is, when a pair of horizontal block gates 172, 172 are moved forth with respect to the airflow path 156, the volume of the airflow path 156 is reduced by the pair of the horizontal block gates 172, 172, thereby increasing the velocity of the air current flowing in the airflow path 156. In contrast, when the pair of horizontal block gates 172, 172 are moved back with respect to the airflow path 156, the volume of the airflow path 156 is increased thereby reducing the velocity of the air current flowing in the airflow path 156. This horizontal block gate 172 is a block body having an enough volume to block the airflow path 156 via a seal, which is not shown and attached to the horizontal block gate 172, and is also provided in the airflow paths 158 and 160 respectively.

According to the solid-gas separating tank 150 having a horizontal block gate 172 and a particle counter 174, the volume of the airflow path 156 is varied by the horizontal block gates 172, 172 based on the quantity of the blasting medium 34 measured by the particle counter 174 to adjust the velocity of the air current flowing in the airflow path 156. That is, when the quantity of the blasting medium 34 is large, the volume of the airflow path 156 is increased by the horizontal block gates 172, 172 thereby reducing the velocity of the air current flowing in the airflow path 156. This facilitates the solid-gas separation of the blasting medium 34 and air, thereby ensuring the separation of the blasting medium 34 and air.

Further, according to the solid-gas separating tank 150 having a particle counter 174, the amount of movement of the horizontal block gates 172, 172 may be controlled such that the quantity of the blasting medium 34 measured by the particle counter 174 is not more than a predetermine value. This enables an automatically controlled operation. For example, each horizontal block gate 172, 172 of the airflow paths 156, 158 and 160 may be operated so that the air velocity in the airflow path 156, 158, 160 is adapted to be lower than the terminal velocity of the medium thereby minimizing the quantity of a blasting medium 34 measured by the particle counter 174.

Reference numeral 180 in FIG. 10 designates a urethane-lined plate against which the blasting medium 34, which has risen in the airflow path 156, collides. Further, reference numeral 182 in FIG. 8 designates a break-up plate for causing the blasting medium 34, which has collided against the urethane-lined plate 86 and is going to fall, to be picked apart and to fall onto the sieve 88; the break-up plates being disposed in three steps.

Now, the solid-gas separating tank 150 includes an anemometer (air velocity measuring device) 184 for measuring the air velocity of the air current flowing in the vertically rising pipe 84 as shown in FIG. 8, and a pressure sensor (pressure measuring device) 186 for measuring pressure in the vertically rising pipe 84, and further includes a control portion (control device) 188 for controlling the rotational speed of the blower 18 based on the air velocity measurement from the anemometer 184 so that the air velocity is kept within a predetermined range and, when the pressure in the vertically rising pipe 84 exceeds a predetermined value based on a pressure measurement from the pressure sensor 186, controlling the rotational speed of the blower 18 to be not higher than a predetermined value.

According to the solid-gas separating tank 150 including this control portion 188, since the air velocity of the air current flowing in the vertically rising pipe 84 is measured with the anemometer 184 and the pressure in the vertically rising pipe 84 is measured by the pressure sensor 186, and based on these measured values, the rotational velocity of the blower 18 is controlled, it is possible to prevent failures caused by the blockage in the vertically rising pipe 84.

Further, the urethane-lined plate 86 of the solid-gas separating tank 150 is applied to a base plate 191 which is pivotable via an axis 190 and thereby the inclination angle of the urethane-lined plate 86 is adjustable. Furthermore, the upstream end portion of the sieve 88 is pivotably attached to the tank body 82 via a hinge 192 so that the inclination angle of the sieve 88 is adjustable.

According to this solid-gas separating tank 150, the inclination angle of the urethane-lined plate 86 can be adjusted to be an angle at which the blasting medium 34 which has risen toward the urethane-lined plate 86 will not collide with the blasting medium 34 which has collided against the urethane-lined plate 86 and is falling. Moreover, the inclination angle of the sieve 88 can be appropriately set to be an angle in accordance with the above described kinds of the blasting medium 34. Thus, the blasting medium 34 which has fallen to the sieve 88 can be appropriately classified.

Figure 9A:
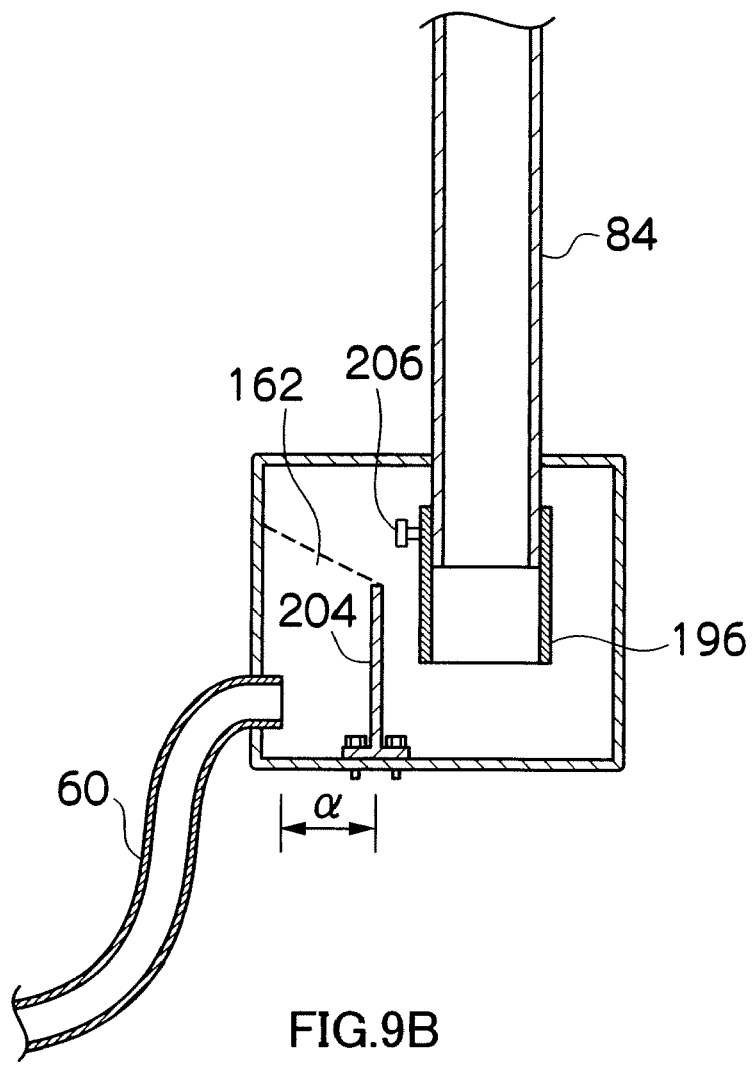
FIGS. 9A and 9B are structure diagrams to show the configuration of the sucking unit of the solid-gas separating tank shown in FIG. 8.

Furthermore, this solid-gas separating tank 150 is configured to be extendable by a double tube configuration in which the top and bottom ends of the vertically rising pipe are formed of outer barrels 194 and 196. Moreover, slide gates 198, 200 and 202 for adjusting the opening areas of the entrances 155, 157 and 159 of the airflow paths 156, 158 and 160 respectively are provided to be movable up and down. Furthermore, as shown in FIG. 9A, the configuration is such that the distance ($\alpha$) between the cushioning plate 204, which is located between the sucking unit 80 and the vertically rising pipe 84 and against which the blasting medium 34 collides, and the hose 60 is adjustable.

Figure 9B:
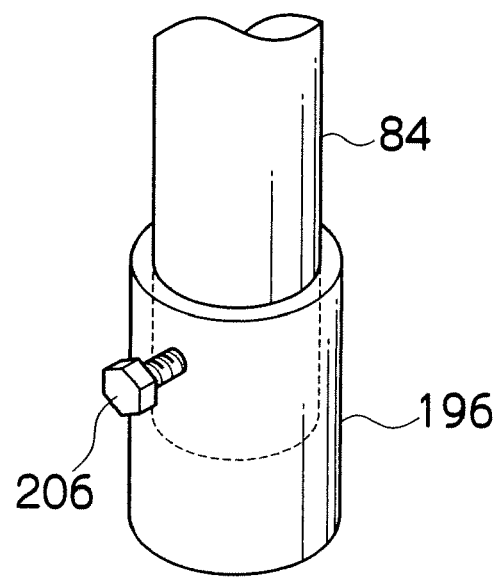

According to this solid-gas separating tank 150, by adjusting the amount of extension of the outer barrels 194 and 196 provided at the top and bottom ends of the vertically rising pipe 84 by use of bolt 206 as shown in FIG. 9B; adjusting the opening areas of the entrances 155, 157 and 159 of the airflow paths 156, 158 and 160 by the slide gates 198, 200 and 202; and adjusting the distance ($\alpha$) between the cushioning plate 204 and the hose 60, it is made possible to realize an optimal suction and solid-gas separation depending on the kinds of the blasting medium 34 of different volumes and masses. For example, in the case of a blasting medium of a heavy mass, the setting is such that the outer barrel 196 of the bottom end of the vertically rising pipe 84 is extended to enhance the suction force; the opening areas of the entrances 155, 157 and 159 of the airflow paths 156, 158 and 160 are reduced by the slide gates 198, 200 and 202; and the distance between the cushioning plate 204 and the hose 60 is set to be smaller. Further, in the case of a blasting medium of a sponge fragment having a small mass, the above setting may be reversed.

Figure 11:
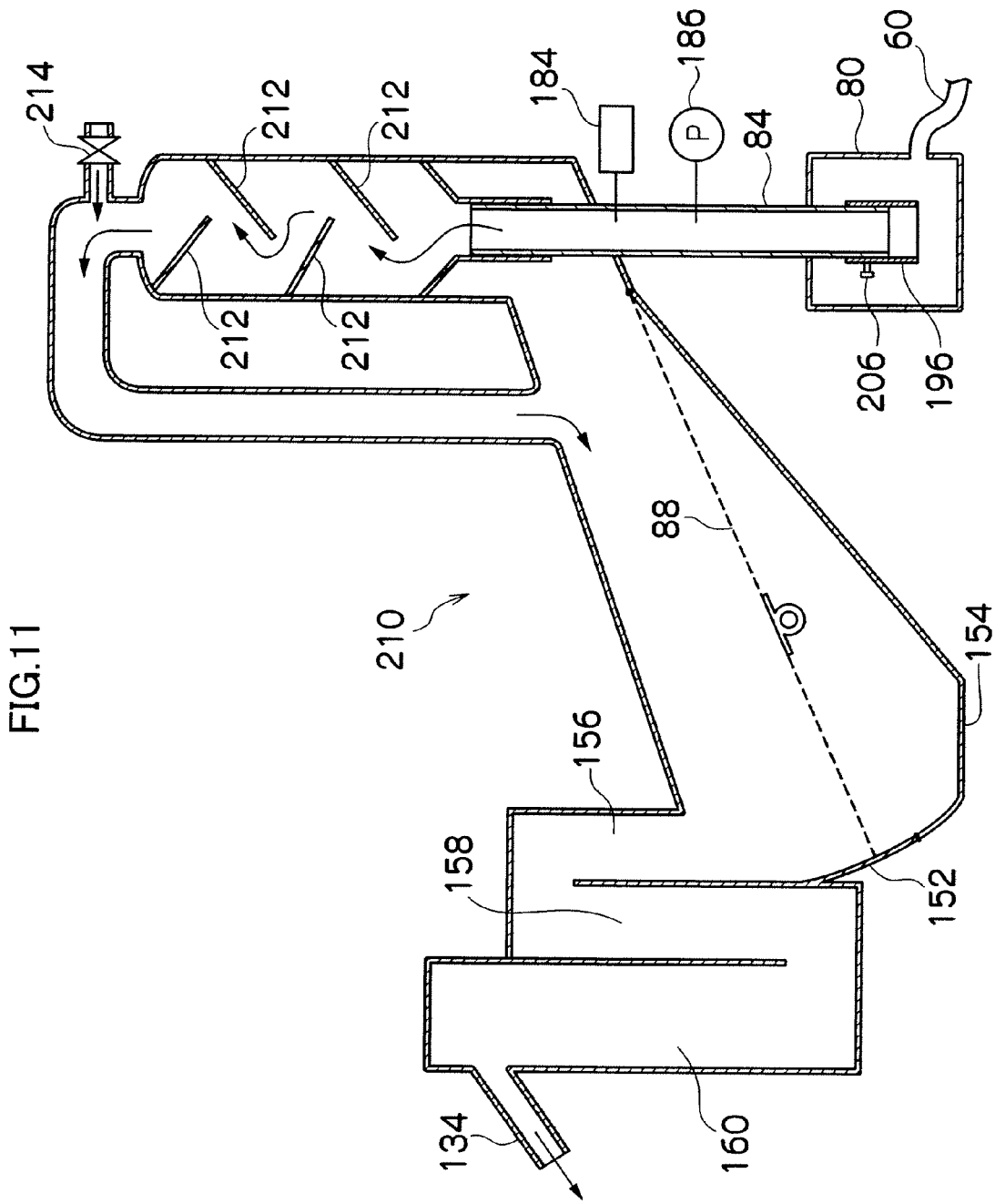
FIG. 11 is a longitudinal sectional view of the solid-gas separating tank according to the third embodiment.

FIG. 11 is a longitudinal sectional view to show the third embodiment of the solid-gas separating tank 210.

In this solid-gas separating tank 210, the flow path in the upper part of the vertically rising pipe 84 which is formed like a labyrinth by disposing baffle plates 212, 212 . . . in an alternately staggered form. Since configuring the flow path in a labyrinth form will reduce the velocity of the air current which contains a blasting medium 34 and ascends in the vertically rising pipe 84, a solid-gas separation effect can be obtained in the vertically rising pipe 84.

Further, this solid-gas separating tank 210 is provided in the upper part of the vertically rising pipe 84 with an atmospheric inlet valve 214. Although, when the vertically rising pipe is blocked with the blasting medium 34, an excess electric current may flow through the blower 18 (see FIG. 1) thereby causing failure of the blower 18, an atmospheric release valve 214 is provided in the upper part of the vertically rising pipe 84 as described above and when an excess current flows through the blower 18 caused by the blockage of the vertically rising pipe 84, the atmospheric release valve 214 is opened. This allows the blower 18 to be operated stably thereby preventing its failures.

In the solid-gas separating tanks 16, 150 and 210 described in the preferred embodiments, there is obtained in a recording portion of the control portion, historical information indicating the number of reuses and the operating conditions in accordance with the number of reuses for each kind of the blasting medium 34 as described above. Then, in a subsequent operation, the control portion controls each driving portion of the solid-gas separating tanks 16, 150 and 210 so that the operating condition in accordance with the number of reuses of the blasting medium 34 is automatically reproduced and set from the aforementioned historical information. This enables an optimal automatically controlled operation in accordance with the selected blasting medium.

What is claimed is:

1. A recovery device for recovering of a blasting medium, that has been sprayed at a work and has fallen therefrom into a solid-gas separating tank, by suctioning with a suction blower, wherein the solid-gas separating tank comprising:
   a sucking unit of the blasting medium;
   a vertically rising pipe provided in a vertical direction and adapted to connect the sucking unit and a tank body;
   a cushioning member disposed opposite an upper exit of the vertically rising pipe;
   a sieve into which the blasting medium that has collided against the cushioning member reducing its velocity falls, and which vibrates to classify a reusable blasting medium and a non-reusable blasting medium;
   an outlet portion for the reusable blasting medium classified by the sieve and an outlet portion for the non-reusable blasting medium; and
   an airflow path provided downstream of the sieve in an air current direction, and connected to the suction blower.

2. The recovery device of a blasting medium according to claim 1, further comprising:
   a block-type gate member which adjusts a velocity of air current flowing in an airflow path by varying a volume of the airflow path; and
   a quantity measuring device which measures the quantity of the blasting medium discharged from an exit of the airflow path per unit time.

3. The recovery device of a blasting medium according to claim 2, further comprising:
   an air velocity measuring device which measures the air velocity of the air current flowing in the vertically rising pipe;
   a pressure measuring device which measures a pressure in the vertically rising pipe; and
   a control device which controls a rotational speed of the suction blower based on an air velocity measurement at the air velocity measuring device so that the air velocity is within a predetermined range, and which controls the rotational speed of the suction blower to be not larger than a predetermined value based on a pressure measurement at the pressure measuring device when the pressure in the vertically rising pipe exceeds a predetermined value.

4. The recovery device of a blasting medium according to claim 2, wherein
   an inclination angle of the cushioning member and/or the sieve is adjustable.

5. The recovery device of a blasting medium according to claim 2, wherein
   a top and a bottom end part of the vertically rising pipe are configured to be extendable, a slide gate which adjusts an opening area of an entrance of the airflow path is provided to be movable up and down, and the distance between a cushioning plate, which is disposed between the sucking unit and the vertically rising pipe and against which the blasting medium collides, and the sucking unit is adjustable.

6. The recovery device of a blasting medium according to claim 2, wherein
   the flow path in the upper part of the vertically rising pipe is configured to be in the form of a labyrinth.

7. The recovery device of a blasting medium according to claim 2, wherein
   the block-type gate member is automatically moved by a driving mechanism so that the pressure in the vertically rising pipe is within a predetermined range and the quantity of the blasting medium measured by the quantity measuring device is not larger than a predetermined value.

8. The recovery device of a blasting medium according to claim 1, further comprising:
   an air velocity measuring device which measures the air velocity of the air current flowing in the vertically rising pipe;
   a pressure measuring device which measures a pressure in the vertically rising pipe; and
   a control device which controls a rotational speed of the suction blower based on an air velocity measurement at the air velocity measuring device so that the air velocity is within a predetermined range, and which controls the rotational speed of the suction blower to be not larger than a predetermined value based on a pressure measurement at the pressure measuring device when the pressure in the vertically rising pipe exceeds a predetermined value.

9. The recovery device of a blasting medium according to claim 8, wherein
   an inclination angle of the cushioning member and/or the sieve is adjustable.

10. The recovery device of a blasting medium according to claim 8, wherein
    a top and a bottom end part of the vertically rising pipe are configured to be extendable, a slide gate which adjusts an opening area of an entrance of the airflow path is provided to be movable up and down, and the distance between a cushioning plate, which is disposed between the sucking unit and the vertically rising pipe and against which the blasting medium collides, and the sucking unit is adjustable.

11. The recovery device of a blasting medium according to claim 8, wherein
    the flow path in the upper part of the vertically rising pipe is configured to be in the form of a labyrinth.

12. The recovery device of a blasting medium according to claim 1, wherein
    an inclination angle of the cushioning member and/or the sieve is adjustable.

13. The recovery device of a blasting medium according to claim 12, wherein
    a top and a bottom end part of the vertically rising pipe are configured to be extendable, a slide gate which adjusts an opening area of an entrance of the airflow path is provided to be movable up and down, and the distance between a cushioning plate, which is disposed between the sucking unit and the vertically rising pipe and against which the blasting medium collides, and the sucking unit is adjustable.

14. The recovery device of a blasting medium according to claim 12, wherein
    the flow path in the upper part of the vertically rising pipe is configured to be in the form of a labyrinth.

15. The recovery device of a blasting medium according to claim 1, wherein a top and a bottom end part of the vertically rising pipe are configured to be extendable, a slide gate which adjusts an opening area of an entrance of the airflow path is provided to be movable up and down, and the distance between a cushioning plate, which is disposed between the sucking unit and the vertically rising pipe and against which the blasting medium collides, and the sucking unit is adjustable.

16. The recovery device of a blasting medium according to claim 15, wherein
the flow path in the upper part of the vertically rising pipe is configured to be in the form of a labyrinth.

17. The recovery device of a blasting medium according to claim 1, wherein
the flow path in the upper part of the vertically rising pipe is configured to be in the form of a labyrinth.

18. The recovery device of a blasting medium according to claim 1, wherein
an atmospheric inlet valve is provided in the upper part of the vertically rising pipe and the amount of suction suctioned by the suction blower is controlled to be within a predetermined range.

19. A method of recovering a blasting medium, comprising the steps of:
using the recovery device of a blasting medium according to claim 1;
obtaining historical information indicating the number of reuses and operating conditions in accordance with the number of reuses for each kind of the blasting medium; and
controlling, in a subsequent operation, such that the operating condition in accordance with the number of reuses of that kind of the blasting medium is automatically reproduced and set from the historical information.

* * * * *